United States Patent Office
3,181,819
Patented May 4, 1965

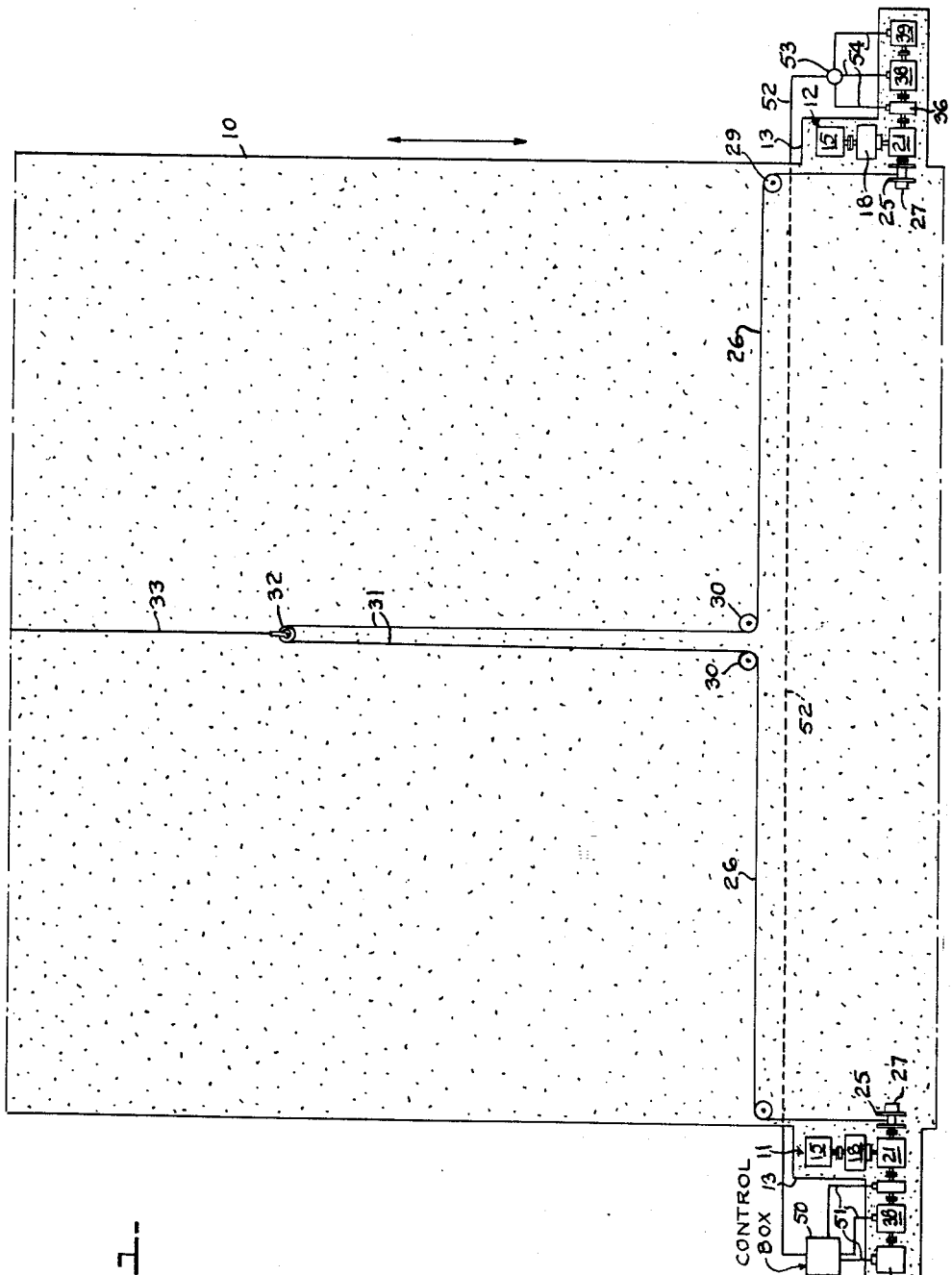

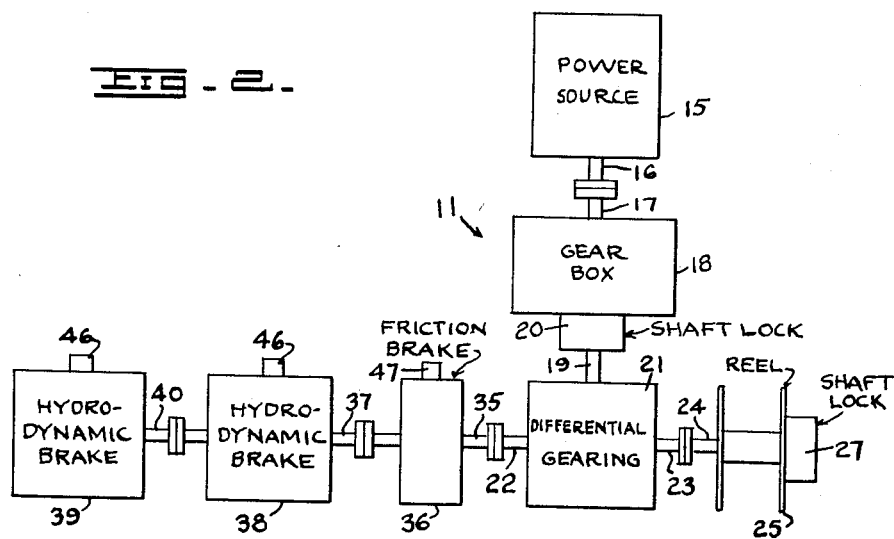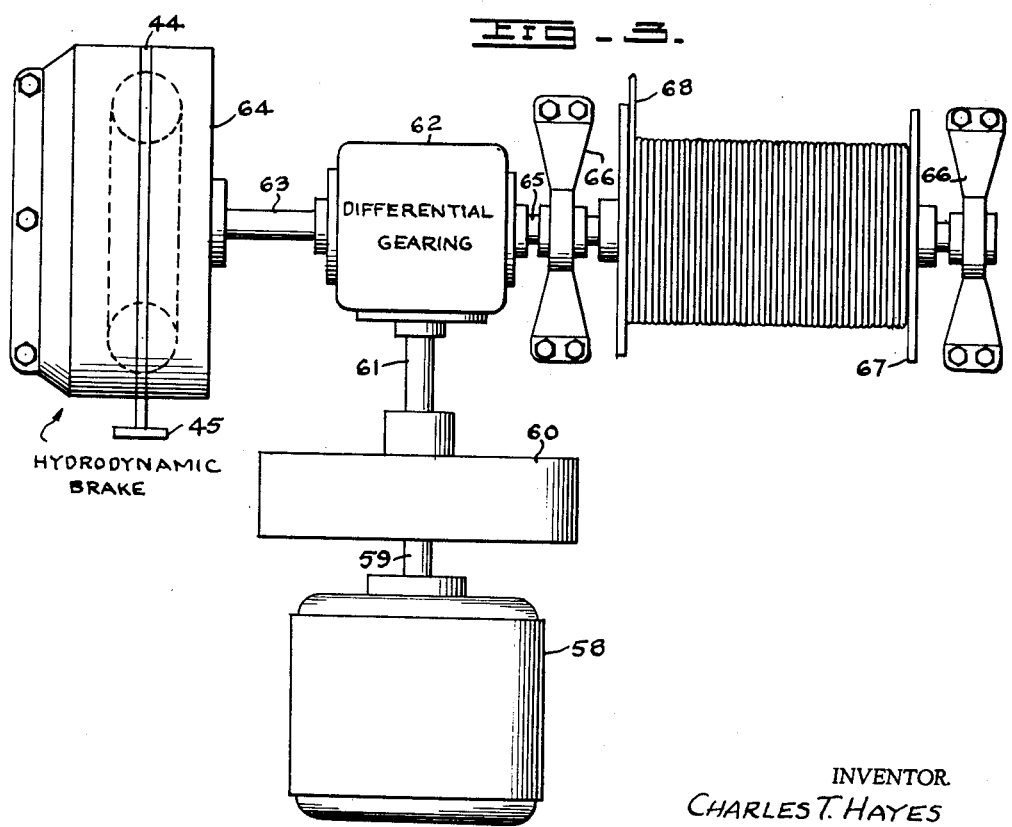

3,181,819
AIRCRAFT ARRESTING AND LAUNCHING SYSTEM
Charles T. Hayes, Coffeyville, Kans., assignor to Parkersburg-Aetna Corporation, Coffeyville, Kans., a corporation of Kansas
Filed July 22, 1963, Ser. No. 296,786
6 Claims. (Cl. 244—63)

This invention relates to a method and apparatus for arresting or launching aircraft on relatively short air strips where it is difficult to handle aircraft of substantial size.

Substantial problems are involved in launching and arresting aircraft with respect to a short runway. So far as is known, no single organization of units has been able to accomplish either the launching or the landing of the aircraft particularly with respect to a short landing field. In launching an aircraft from such field, it is necessary to provide relatively rapid acceleration of the cable or other flexible element connected to the craft. Efforts to do this have involved the use of a reel about which the cable or the like is wound, a prime mover, and some type of clutch for transmitting power from the prime mover to the reel. This has been quite difficult for several reasons. In the first place, the required torque capacity is outside the range of any commercial clutches at present available. The amount of heat generated as a result of slip during the engagement period also is beyond the range of commercial clutches. The application of torque by the clutch must be adjustable between wide limits in an extremely short time and with a very high degree of accuracy.

The required torque capacity and the heat generated prohibit the use of orthodox friction clutches of the air-cooled type, and even if liquid cooling is used, the rate of wear and consequent maintenance cost is not acceptable. Fluid clutches of the hydro-dynamic type have been proposed and eliminate, or at least minimize, the problems of heat dissipation and rapid wear, but it is doubtful whether a hydro-dynamic clutch could be designed which would have the necessary high torgue capacity and, at the same time, a moment of inertia low enough to permit it to be accelerated very rapidly without overstress. The same factors of difficulty would be present in an aircraft arresting system.

An important object of the present invention is to provide a novel method of arresting an aircraft on a landing field by resisting the paying out of the arresting cable by the application of progressively increasing hydro-dynamic resistance, substantially the same method being involved in the launching of an aircraft, thus making it practicable to both launch and arrest an aircraft taking off from and landing on an air strip of limited length.

A further object is to provide a novel organization of units into an entity capable of either launching or arresting an aircraft, eliminating the necessity of providing different types of apparatus for the two purposes.

A further object is to provide such an apparatus wherein a novel use is made of units each including one or more hydro-dynamic brakes for rapidly and accurately accelerating or decelerating an aircraft in the launching and arresting thereof respectively.

A further object is to employ in such combination a conventional type of differential gearing which is employed in one manner for launching an aircraft and in a different manner for arresting it, and wherein the torque on the reels is rapidly and accurately progressively changed by the use in each unit in combination with the differential gearing of one or more hydro-dynamic brakes.

A further object, in the use of the system for launching aircraft, is to provide a pair of units each including a prime mover which drives the input shaft of the differential gearing, the output shafts of which are connected respectively to a reel and to braking means including a hydro-dynamic brake, whereby, by proper control means, the braking action of the hydro-dynamic brake may be rapidly increased from minimum to maximum, thus rapidly and accurately increasing the torque transmitted from the other output shaft to the reel on which the cable is wound, thus transmitting a rapidly increasing pulling force to the plane to assist its launching from an air strip.

A further object is to use the same organization of elements, generally speaking, for hydro-dynamically braking the reels for decelerating an aircraft upon the landing thereof on the air strip.

Other objects and advantages of the invention will become apparent during the course of the following description.

In the drawings I have shown two embodiments of the invention. In this showing:
FIGURE 1 is a plan view of a portion of an air strip diagrammatically showing the placing and combination of units employed for launching or arresting an aircraft on the air strip,
FIGURE 2 is an enlarged diagrammatic view of one of the two sets of units employed, and
FIGURE 3 is a plan view of a simplified type of system which may be employed in the launching of an aircraft.

Referring to FIGURE 1, the numeral 10 designates a portion of a landing strip the length of which is indicated by the double-ended arrow. Near the take-off end of the air strip is arranged two combinations of units respectively indicated by the numerals 11 and 12 constituting the main portions of the present invention, and these units may be mounted on suitably extended base portions 13 of the air strip, particularly if the latter is formed of concrete.

Except as explained below, each combination of units 11 and 12 is identical and the unit 11 has been somewhat more clearly shown in FIGURE 2. Such unit comprises a power source 15 having a drive shaft 16 coupled to the input shaft 17 of a suitable gear box 18, the output shaft 19 of which is provided with a conventional shaft lock 20. The shaft 19 also constitutes the input shaft of a conventional differential gearing 21 having axially aligned output shafts 22 and 23. The output shaft 23 is coupled to the shaft 24 of a reel 25 on which is wound one end of a looped cable 26 (FIGURE 1) and the shaft of the reel 25 is provided with a conventional shaft lock 27.

As stated above, the cable or other flexible element is what may be termed looped in form, the two ends of which are wound on the reels 25 of the two units 11 and 12. The cable hook-up in FIGURE 1 is particularly for launching an aircraft, in which case the cable from the reels 25 passes around sheaves 29, and then, intermediate the width of the air strip, passes about sheaves 30 and extends longitudinally of the air strip centrally thereof as at 31 and then around a sheave 32 to which is connected a pull-line 33 to be connected to an aircraft to be launched. For arresting an aircraft, the cable 26 will be disconnected from the sheave 32 and from the sheaves 30 and will extend directly across the air strip to be engaged by a tail hook on the aircraft when movement of the latter is to be arrested.

Referring again to FIGURE 2, the output shaft 22 of the differential gearing is coupled to the shaft 35 of a friction brake 36, and the other end of the shaft 35 is coupled to the shaft 37 of a hydro-dynamic brake 38. If desired, and particularly for heavier aircraft, two hydrodynamic brakes are employed, the second one being indicated by the numeral 39 and having its shaft 40 coaxial with and coupled to the adjacent end of the shaft 37.

Conventional fluid clutches of the hydro-dynamic type are not available with any form of control mechanism which would permit the required extremely accurate and rapid adjustment of torque, as is essential in a system of this character. However, a control system having the desired basic characteristics is well-known and has been used commercially with fluid brakes of the hydro-dynamic type for many years. Such system employs what is commonly known as "sluice gates" and is described and illustrated in a number of United States patents and other published data, and particular reference is made to Patent No. 2,267,852. Referring briefly to FIGURE 3, such a hydro-dynamic brake has been illustrated as being provided with a sluice gate 44 having control means diagrammatically shown as at 45 for adjusting the sluice gate between fully operative and inoperative positions. When the sluice gate is fully closed, the rotor and stator pockets of the brake are disconnected from each other, in which case, the braking action is negligible. The sluice gate may be progressively opened to progressively open the rotor and stator pockets to each other to increase the torque of the brake until a position of maximum torque is reached with the sluice gates fully opened. The brakes 38 and 39 are of this type and the controls therefor have been diagrammatically designated by the numeral 46. These controls operate the sluice gates of the brakes and may be of any desired type, for example, hydraulic cylinders and pistons for moving the sluice gates, or fractional horsepower motors. A similar control 47 is provided for the friction brake 36.

Both units 11 and 12 may be arranged at one side of the runway with the cable 26 suitably reaved around sheaves to provide the layout of the cable means overlying the runway. It is preferred that the units be arranged at opposite sides of the runway, but that the two units be simultaneously controlled from a single control center. To this end, there is shown associated with the unit 11 (FIGURE 1) a main control box 50 having lines 51 running to the controls 46 and 47 of the brakes. These lines may be electrical for controlling small motors, or they may be hydraulic lines, the pressure in which is controlled from the box 50. What is shown as a line 52 extends from the box 50 across and either through or beneath the runway and will carry cables or hydraulic lines to a junction box 53 associated with the unit 12 and from which lines 54 extend to the controls 46 and 47 of the unit 12. All corresponding elements of each unit, therefore, may be simultaneously and accurately controlled.

In FIGURE 3 of the drawings there is shown a simplified type of mechanism which may be used in itself for launching an aircraft of a lighter type, or two of which in combination may be used as in FIGURE 1 for either launching or arresting an aircraft. In FIGURE 3 the power source is shown as a motor 58, the drive shaft 59 of which extends through a fly-wheel 60 and becomes or is connected to the input shaft 61 of a differential gearing 62. The output shaft 63 of the differential gearing is connected to the rotor of a hydro-dynamic brake 64 of the type referred to. The other output shaft 65 of the differential gearing is supported in bearings 66 between which is arranged a reel 67 having a cable 68 wound thereon. For the purpose of launching an aircraft with the single unit of FIGURE 3, the cable 68 will pass around one of the sheaves 29 and then around one sheave 30 and will have a free end directly connected to an aircraft to be launched. Where two of the units in FIGURE 3 are used as in FIGURE 1, the looped cable arrangement will be employed in the same manner as described above.

*Operation*

The operation of the mechanism for launching an aircraft will be first considered. As previously stated, both units 11 and 12 could be arranged at the same side of the runway with the looped cable properly reaved around sheaves to provide the arrangement shown in FIGURE 1. It will be assumed that the arrangement of units shown will be in operation. It also will be assumed that the pull cable 33 and sheave 32 will be used. However, because of the accuracy of control which can be provided with the system, the forward extremity of the cable portion 31 could be directly connected to the aircraft. The sheave 32 may be used to provide positive equalization between the pulling forces on the two cables 31.

Assuming that the aircraft is setting on the runway at the remote end thereof, that is, from the top as viewed in FIGURE 1, and connected to the cable or the usual bridle tapes, the reels 25 would be stationary and held in that condition by the shaft locking devices 27 and/or by the aircraft wheel brakes and the tension of the cables. The shaft locking devices 20 would be disengaged and the hydrodynamic brakes 38 and 39 and the friction brakes 36 would be set in minimum load position. Assuming that the aircraft is ready for take-off, the prime movers 15 would be set in operation and would drive the input shafts 19 of the differential gearings 21 through the gear boxes 18. It will be understood that operation of the prime movers also would be synchronized by any suitable means.

The shaft locking devices 27 would be disengaged, thus making the reels 25 free to rotate under the influence of any torque transmitted to them by the shafts 23. In accordance with the well-known operation of differential gearing, the torque entering the differential gearings through their input shafts 19 would tend to divide between the shafts 22 and 23 of each of the units, and the rotational speed of these output shafts would vary with the torque loading imposed on them.

On releasing the shaft locking devices 27, therefore, the reels 25 of the two units would tend to rotate in the same direction as the output shafts 22. Initially only a small value of torque would be imparted to the reels since the loads on the shafts 22 would be very low and the speed of these shafts consequently would be high. In order to increase the torque and speed to the reels 25, the torque loading on the shafts 22 would be increased by operating the control mechanisms for the hydro-dynamic brakes. This would be accomplished by movement of the sluice gates of the hydro-dynamic brakes from their fully closed positions toward their open positions. Such operation of the sluice gates would cause the hydro-dynamic brake rotors to decelerate at a rate determined by the rapidity with which the controlling sluice gates were opened. Thus there would be provided a ready and accurate means for controlling the acceleration rate of the reels 25. In other words, in accordance with the fuctioning of the differential gearing, the progressively and rapidly increasing braking of the output shafts 22 would progressively and rapidly increase the torque and speed of the reels 25.

The friction brakes 36 are not basic essentials in the system, as suggested in the hook-up in FIGURE 3 for aircraft below certain weights and for air strips above certain minimum lengths. For larger aircraft, however, the friction brakes would be necessary in order to brake the shafts 22 to rest. The friction brakes would be utilized to augment the torque capacity of the hydro-dynamic brakes 38 and 39 over the lower end of their speed range. It will be apparent that braking the shafts 22 to rest would provide the reels 25 with maximum speed and torque as would be necessary under some conditions. Since the friction brakes do not come into operation except over the lower end of the speed range of the hydro-dynamic brakes, the energy dissipated in the friction brakes would represent only a fraction of the total energy dissipated and the life of the linings of the friction brakes consequently would be long.

While any control means for the hydro-dynamic brakes and friction brakes may be employed, it would be advantageous, although forming no part per se of the present invention, that the friction brakes be actuated by hydraulic pressure derived from small pumps driven from the shafts 23 so that pressure developed would vary as the square of the reel speed. Such pumps could be arranged to cut in when the speed of the shafts 22 has fallen to the valve at which the hydro-dynamic brakes were no longer capable of furnishing the full torque requirements for maximum reel torque and speed, and from that point onward, the friction brake torque would increase inversely as the square of its speed, thus matching the rate of decrease in the torque of the hydro-dynamic brakes.

From the foregoing, it will be apparent that the system of FIGURE 1 is highly efficient for launching relatively heavy aircraft from air strips of limited length, for example, 600 yards, and it will be obvious, of course, that during the take-off, the aircraft would be furnishing its own power to augment the pull delivered to it by the present system. For lighter aircraft, of course, the simplified arrangement in FIGURE 3 may be employed, the general functioning of which will be the same as described above. The progressive opening of the sluice gate 44 to brake the shaft 63 would progressively increase the torque and speed of the reel 67 at any desired rate in accordance with the rate at which the sluice gate 44 is opened. Since the sluice gates in both systems may be readily controlled, rapid and accurate acceleration of the reels is provided.

For the arresting of landing aircraft, the cable or bridle tape 26 would be disconnected from the sheaves 30 and 32 and thus would extend straight across the air strip, as will be obvious. In this case, of course, the cables would be fully wound on the reels 25, ready to pay out when the aircraft tail hook engages the cross cable. The power source 15 would be at rest and the shaft lock 20 would be engaged, the locking devices 27 would be disengaged, and the hydro-dynamic brakes 38 and 39 and friction brakes 36 would be set for minimum loads. If desired, the friction brakes 36 could be applied sufficiently to maintain some tension in the arresting cable stretched across the runway.

In either use of the system, the hydro-dynamic brakes 38 and 39 could be arranged to be controlled either by fractional horsepower motors or by direct drive from the brake shafts. In either case, the operation of the brakes could be triggered either by manual means or by the rotation of the brake shafts. Upon engagement of the aircraft tail hook with the arresting cable, the reels 25 would commence to pay out tape or cable. Because of the action of the differential gear boxes 21 and in view of that fact that the shaft 19 would be locked, the shafts 22 and the brake shafts associated therewith would rotate in the direction opposite the direction of rotation of the shafts 23. Dependent upon the characteristics chosen for the brake control mechanisms, braking torque would increase with increasing reel speed at any desired rate and could be leveled off at any desired maximum within the limits of the brakes. In this case, the drive between the shafts 23 and 22 of the two units would be positive, and the characteristics of the hydro-dynamic brakes would be such that a highly efficient and accurately controlled deceleration of the reels 25 could be provided. The friction brakes are not essential, but their use is highly desirable. The aircraft speed can be decelerated to the point where its own brakes are effective for bringing the craft to a complete stop. The use of the friction brakes is preferred, however, since they provide means for bringing the aircraft to a stop, should the brakes of the craft fail.

For arresting operations, the hydro-dynamic brakes preferably should be set for minimum absorption when they start rotating so as to minimize the initial tension in the arrester cable on engagement thereof with the aircraft tail hook. Under such conditions, the initial torque applied to the reel shafts would be limited to the torque required to accelerate the rotating masses. Alternatively, however, the sluice gates for the hydro-dynamic brakes 38 and 39 could be pre-set before each arrest to the degree of opening necessary to provide the correct amount of braking torque, having regard for the weight of the aircraft and the touch-down velocity.

Thus, the system as a whole is effective for launching and arresting aircraft without the necessity for having to use entirely different equipment for each operation. In each case, the system provides means for hydrodynamically varying the torque and speed of a cable reel, the torque on the cable increasing as movement of a landing aircraft is decelerated, and also increasing when a launching operation is taking place. Hydro-dynamic brakes in the present hook-up provide means for accurately and rapidly changing the reel torque, as desired.

The present application discloses those essentials in a system of this character necessary for it operativeness, and it will be apparent that various additional features might be considered advantageous and readily could be added. For example, the reels preferably should be provided with rewinding mechanisms, and means for decelerating the reels to rest after a launching operation.

It is to be understood that the forms of the invention shown and described are to be taken as preferred examples of the same and that various changes in the shape, size, and arrangement of the parts may to made as do not depart from the spirit of the invention or the scope of the appended claims.

I claim:

1. An airplane launching mechanism comprising a differential gearing having an input shaft and a pair of output shafts, a motor connected to said input shaft to transmit driving forces through said differential gearing to said output shafts, a hydro-dynamic brake having a stator, and a rotor connected to one of said output shafts, and a reel connected to the other output shaft and having a line adapted for connection with an airplane to transmit a pulling force thereto upon rotation of said reel, said rotor being normally relatively freely rotatable whereby said other output shaft is adapted normally to remain stationary, said brake being adjustable as to braking effort to progressively decelerate the associated output shaft whereby said other output shaft will be progressively accelerated so that the winding of said line on said reel progressively accelerates movement of the airplane to assist in launching it.

2. An airplane launching mechanism comprising a differential gearing having an input shaft and a pair of output shafts, a motor connected to said input shaft to transmit driving forces through said differential gearing to said output shafts, a hydro-dynamic brake having a stator, and a rotor connected to one of said output shafts, and a reel connected to the other output shaft and having a line adapted for connection with an airplane to transmit a pulling force thereto upon rotation of said reel, said rotor being normally relatively freely rotatable whereby said other output shaft is adapted normally to remain stationary, said brake having rotor and stator pockets and a sluice gate normally arranged between said pockets and movable to uncover said pockets to each other to progressively increase the braking effect of said brake whereby said one output shaft will be progressively decelerated and said other output shaft will progressively accelerated so that the winding of said line on said reel progressively accelerates movement of the airplane to assist in launching it.

3. Apparatus for launching aircraft and for arresting a landing aircraft with respect to a runway, which comprises two mechanisms each comprising a prime mover, a differential gearing having an input shaft and axially aligned output shafts, a reel connected to one output shaft, a hydro-dynamic brake connected to the other output shaft and of the type wherein the braking action is variable between minimum and maximum, and a shaft lock for said input shaft, a cable having opposite ends wound on the reels of said two mechanisms and extending across the runway to be connected to an aircraft to be launched or to engage a tail hook on a landing aircraft, the prime movers of said two mechanisms, when the associated shaft locks are released, driving said input shafts, the controlling of said hydro-dynamic brakes between minimum and maximum braking increasing the torque on said reels for launching an aircraft, said shaft locks, when locked, preventing rotation of said input shafts whereby the output shafts of the differential gearing of said two mechanisms are geared together so that progressive adjustment of said hydro-dynamic brakes for minimum toward maximum progressively brakes said reels to decelerate a landing aircraft.

4. Apparatus according to claim 3 wherein each of said two mechanisms further includes a second hydro-dynamic brake coupled to the first-named hydro-dynamic brake of each mechanism.

5. Apparatus according to claim 3 wherein each of said other output shafts is provided with a friction brake to bring such shaft to rest.

6. An airplane launching-arresting mechanism compressing a differential gearing having an input shaft and a pair of output shafts, a motor connected to said input shaft to transmit power through said differential gearing to said output shafts, a reel connected to one output shaft, a cable wound on said reel and having an extending end to be connected to an aircraft to be launched or to engage with a tail hook on a landing aircraft, a hydro-dynamic brake connected to the other output shaft and of the type wherein the braking action is variable between minimum and maximum, a shaft lock for said input shaft, said motor, when said shaft lock is released driving said input shaft, the controlling of said hydro-dynamic brake between minimum and maximum braking increasing the torque on said reel for launching an aircraft, said shaft lock, when locked, preventing rotation of said input shaft whereby the output shafts of said differential gearing are geared together so that progressive adjustment of said hydro-dynamic brake from minimum toward maximum progressively brakes said reel to decelerate a landing aircraft.

References Cited by the Examiner
UNITED STATES PATENTS
2,543,278  2/51  Davis _____ 74—710.5 X

OTHER REFERENCES

Aerospace Engineering, May 1961, pp. 24, 25 and 55–58.

MILTON BUCHLER, *Primary Examiner.*

ANDREW H. FARRELL, *Examiner.*